United States Patent
Kramer

(10) Patent No.: US 6,542,243 B2
(45) Date of Patent: Apr. 1, 2003

(54) RESONATOR OPTICS MONITORING METHOD

(75) Inventor: Matthias Kramer, Göttingen (DE)

(73) Assignee: Lambda Physik AG, Goettingen (DE)

( * ) Notice: Subject to any disclaimer, the term of this patent is extended or adjusted under 35 U.S.C. 154(b) by 54 days.

(21) Appl. No.: 09/769,019

(22) Filed: Jan. 24, 2001

(65) Prior Publication Data

US 2001/0033383 A1 Oct. 25, 2001

Related U.S. Application Data

(60) Provisional application No. 60/178,440, filed on Jan. 27, 2000.

(51) Int. Cl.$^7$ .......................... G01N 21/00; G01B 9/02
(52) U.S. Cl. .................... 356/450; 356/454; 356/519; 356/239.2; 372/29.02
(58) Field of Search ................ 356/450, 454, 356/519, 239.2

(56) References Cited

U.S. PATENT DOCUMENTS

| | | | | |
|---|---|---|---|---|
| 3,654,626 A | 4/1972 | Geller et al. | ........... | 340/173 CC |
| 3,723,007 A | 3/1973 | Leonard | ................. | 356/75 |
| 4,091,681 A | 5/1978 | Hordvik | ................. | 73/574 |
| 4,182,572 A | 1/1980 | Quillfeldt | ................. | 356/318 |
| 4,362,364 A | 12/1982 | Smith | ................. | 350/358 |
| 4,447,153 A | 5/1984 | Cremers et al. | ........... | 356/361 |

(List continued on next page.)

FOREIGN PATENT DOCUMENTS

| | | | | |
|---|---|---|---|---|
| JP | 3-139893 | 6/1991 | ......... | H01S/3/1055 |
| JP | 5-283785 | 10/1993 | ......... | H01S/3/1055 |
| JP | 411274632 | 8/2000 | ........... | H01S/3/137 |
| JP | P2000-216464 A | 8/2000 | ......... | H01S/3/1055 |

OTHER PUBLICATIONS

Klein, P.H., et al., "Potassium Bromide for Infrared Laser Windows: Crystal Growth, Chemical Polishing, and Optical Absorption," *Infrared Laser Windows*, vol. 11, No. 10, 1976, pp. 1335–1342.

Glass, A.J., et al., "Laser Induced Damage in Optical Materials," *National Bureau of Standards, presented at the Annual Symposium on Optical Materials for High Power Lasers*, Sep. 1978, 328 pages.

Itoh, et al., "Absorption Measurement of the Optical Materials by Real Time Holographic Interferometry," *Optics Communications*, vol. 33, No. 2, May 1980, pp. 183–187.

Edwards, D.F., "Low-level Losses in Ultraviolet Laser Window Materials," *SPIE Proceedings of the Loas Almos Conference on Optics '81*, vol. 288, 1981, pp. 18–20.

Swimm, et al., "Calorimetic Study of Optical Absorption of Suprasil W–1 Fused Quartz," *NTIS*, Sep. 1984, 8 pages.

Laidler, et al., "The Effect of Impurities on U.V. Damage in CaF2," *NIST Special Publication 752, 18 Symposium on Optical Materials fir High Power Lasers*, 1988, pp. 151–158.

(List continued on next page.)

*Primary Examiner*—Robert H. Kim
*Assistant Examiner*—Krystyna Suchecki
(74) *Attorney, Agent, or Firm*—Sierra Patent Group, Ltd.; Andrew V. Smith

(57) ABSTRACT

A technique for testing the quality of optical components of a line-narrowing module is performed on-line. As the wavelength tends to drift from a desired value when the optical components of the line-narrowing module are heated due to absorption, one or more optical components is adjusted such as by rotation to tune the wavelength back to the desired wavelength using a feedback loop. The amount of adjustment of these optical components is monitored for indirectly measuring, and thereby testing, the absorption or quality of the optical components.

20 Claims, 8 Drawing Sheets

U.S. PATENT DOCUMENTS

| | | | |
|---|---|---|---|
| 4,707,137 A | 11/1987 | Lee | 356/353 |
| 4,799,767 A | 1/1989 | Woodruff | 350/269 |
| 4,829,536 A | 5/1989 | Kajiyama et al. | 372/57 |
| 4,856,018 A | 8/1989 | Nozue et al. | 372/98 |
| 4,868,768 A | 9/1989 | Draggoo et al. | 364/525 |
| 4,975,919 A | 12/1990 | Amada et al. | 372/33 |
| 5,015,096 A | 5/1991 | Kowalski et al. | 356/371 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,218,421 A | 6/1993 | Wakabayashi et al. | 356/352 |
| 5,404,366 A | 4/1995 | Wakabayashi et al. | 372/29 |
| 5,559,816 A | 9/1996 | Basting et al. | 372/27 |
| 5,596,596 A | 1/1997 | Wakabayashi et al. | 372/102 |
| 5,684,822 A | 11/1997 | Partlo | 372/95 |
| 5,761,236 A | 6/1998 | Kleinschmidt et al. | 372/100 |
| 5,802,094 A | 9/1998 | Wakabayashi et al. | 372/57 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,894,352 A | 4/1999 | Morton | 356/432 |
| 5,894,392 A | 4/1999 | McDonald | 361/42 |
| 5,898,725 A | 4/1999 | Fomenkov et al. | 372/102 |
| 5,901,163 A | 5/1999 | Ershov | 372/20 |
| 5,917,849 A | 6/1999 | Ershov | 372/102 |
| 5,946,337 A | 8/1999 | Govorkov et al. | 372/92 |
| 5,970,082 A | 10/1999 | Ershov | 372/102 |
| 5,978,409 A | 11/1999 | Das et al. | 372/100 |
| 5,982,800 A | 11/1999 | Ishihara et al. | 372/57 |
| 6,028,879 A | 2/2000 | Ershov | 372/57 |
| 6,101,211 A | 8/2000 | Wakabayashi et al. | 372/102 |
| 6,118,527 A * | 9/2000 | Jurca | 219/121.6 |
| 6,317,203 B1 | 11/2001 | Wakabayashi et al. | 356/237.1 |

OTHER PUBLICATIONS

Brimacombe, et al., "Limitations of Fiber–optic Transmission at Short Excimer Laser Wavelengths," *Conference on Laser and Electro–Optics, 1988 Technical Digest Series*, vol. 7, 1988.

Partlo, W.N., et al., "Characterization Methods for Excimer Exposure of Deep–UV Pellicles," *SPIE Optical/Laser Microlithography III*, vol. 1264, 1990, pp. 564–575.

Leclerc, et al., "Transient Absorption and Fluorescence Spectroscopy in Fused Silica Induced by Pulsed KrF Excimer Laser Irradiation," *Appl. Phys., Lett.*, vol. 59, No. 23, Dec. 1991, pp. 3369–3371.

Ihlemann, J., et al., "Nanosecond and Femtosecond Excimer Laser Ablation of Fused Silica," *Applied Physcis A*, vol. 54, No. 4, 1992, pp. 363–368.

Sahba, et al., "Infrared Absorption Coefficients of Silica Glasses," *Journal of the American Ceramic Society*, vol. 75, No. 1, Jan. 1992. pp. 209–212.

Bagratashvili, V. N., et al., "InhomoGeneous Nature of UV Absorption Bands of Bulk and Surface Oxygen–Deficient Centers in Silica Glasses," *Journal of Non–Crystalline Solids*, vol. 180, 1995, pp. 221–229.

Schenker, et al., "Ultraviolet Damage Properties of Various Fused Silica Materials," *SPIE*, vol. 2428, Sep. 1995, pp. 458–468.

Drexlin, et al., "Spectral Attenvation Length of Scintillating Fibers," *Nuclear Insruments and Methods in Physics Research*, vol. 360, Nos. 1, 2, 1995, pp. 245–247.

Malo, et al., "Enhanced Photosensitivity in Lightly Doped Standard Telecommunication Fibre Exposed to High Fluence ArF Excimer Laser Light," *Electronics Letters*, vol. 31, No. 11, May 25, 1995, pp. 879–880.

Whitman, P.K., et al., "Laser–induced Damage of Absorbing and Diffusing Glass Surfaces under IR and UV Irradiation," *Proccedings of the 1998 $30^{th}$ Annual Boulder Damage Symposium on Optical Materials for High Power*, vol. 3578, 1999, 681–391.

* cited by examiner

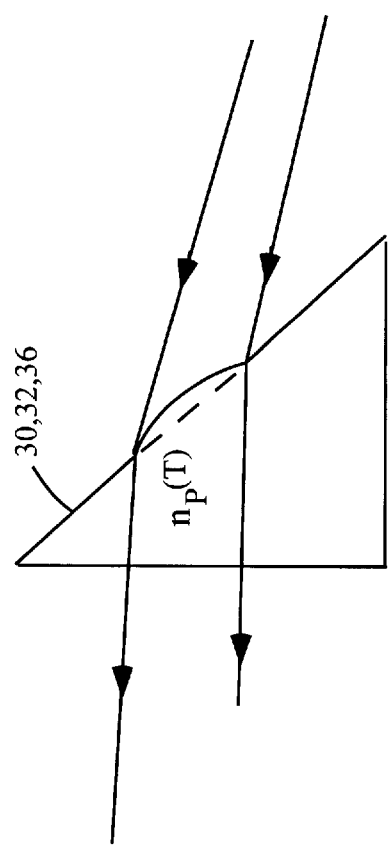
Fig. 2D
Fig. 2E
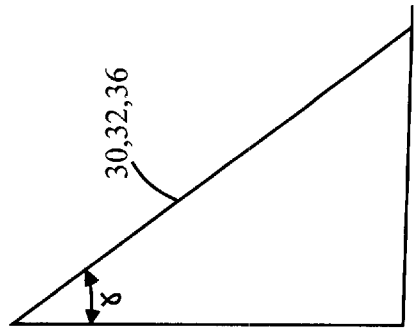
Fig. 2B
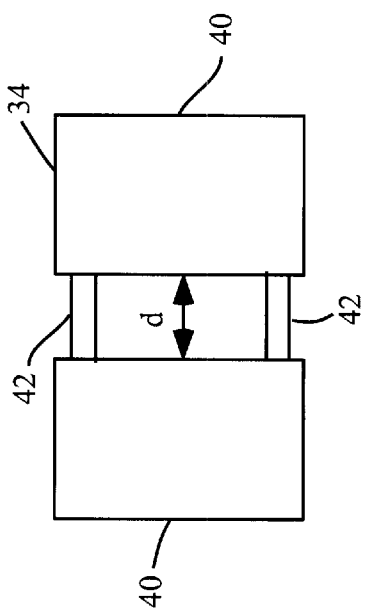
Fig. 2C

RESONATOR OPTICS MONITORING METHOD

PRIORITY

This application claims the benefit of priority to U.S. provisional application No. 60/178,440, filed Jan. 27, 2000.

BACKGROUND OF THE INVENTION

1. Field of the Invention

The invention relates to a laser system resonator optics monitoring method, and particularly to on-line monitoring of the quality of optical components of an installed line-narrowing module.

2. Discussion of the Related Art

Semiconductor manufacturers are currently using deep ultraviolet (DUV) lithography tools based on KrF-excimer laser systems operating around 248 nm, as well as the following generation of ArF-excimer laser systems operating around 193 nm. The ArF and KrF lasers have a broad characteristic bandwidth typically around 300–400 pm (FWHM). Vacuum UV (VUV) uses the F2-laser which characteristically emits two or three closely spaced lines around 157 nm.

Integrated circuit device technology has entered the sub quarter micron regime, thus necessitating very fine photolithographic techniques. The minimum size of a structure that may be produced on a silicon wafer is limited by the ability to optically resolve the structure. This resolution ability depends directly upon the photolithographical source radiation and optics used.

It is important for their respective applications to the field of sub-quarter micron silicon processing, that each of the above laser systems become capable of emitting a known narrow spectral bandwidth around a precisely determined and finely adjustable absolute wavelength. Techniques for reducing bandwidths by special resonator designs to less than 100 pm (for ArF and KrF lasers) for use with all-reflective optical imaging systems, and for catadioptric imaging systems to less than 0.6 pm, are being continuously improved upon.

A line-narrowed excimer or molecular fluorine laser used for microlithography provides an output beam with specified narrow spectral bandwidth. It is desired that parameters of this output beam such as wavelength, bandwidth, and energy and energy dose stabilty be reliable and consistent. Narrowing of the bandwidth is generally achieved through the use of a bandwidth narrowing and/or wavelength selection and wavelength tuning module (hereinafter "line-narrowing module") including most commonly prisms, diffraction gratings and, in some cases, optical etalons and mirrors.

A beam expander of the line-narrowing module typically functions to match the beam to the dimensions of the dispersion element to optimize its dispersive power. In most cases, the beam expander includes one or more beam expanding prisms. The dispersive element of the line-narrowing module typically functions to disperse the incoming beam after magnification by the beam expander. The light is typically dispersed angularly such that light rays of the beam with different wavelengths are reflected at different angles from the dispersion element. Only those rays fitting into a certain "acceptance" angle of the resonator undergo further amplification, and eventually contribute to the output of the laser system. Besides narrowing the bandwidth, then, one or more components of the line-narrowing module can typically be rotated for tuning the output emission wavelength of the laser system, and other tuning methods are being developed (see, e.g., U.S. patent application Ser. No. 60/178,445, which is assigned to the same assignee as the present application and is hereby incorporated by reference).

Line-narrowing modules vary in their response to the exposure to high power or high repetition rate laser beams that cause heating and aging of the optical components. For example, nonuniform heating of the optical elements of the line-narrowing module may substantially degrade their quality by, for example, disrupting the planarity of optical surfaces by localized expansion and causing fluctuations in the thermally dependent refractive index, thereby distorting the wavefront of the retroreflected or transmitted beam and detuning the wavelength. Wavefront distortions lead to changes in the output bandwidth of the laser system which is a parameter that it is desired to keep constant. Wavelength detuning may be compensated by rotating an optical element, typically the grating or HR mirror, as mentioned above. In addition to wavefront distortions and detuning, absorption by optical components results in reduced overall efficiency of the laser.

Parameters of the line-narrowing module that depend on the "quality" of the optical components such as the magnitude of angular dispersion, reflectivity for specific wavelengths, linearity (i.e., absence of wavefront distortions), scattering of the beam. etc., will thus affect the bandwidth, linewidth and overall performance of the laser. The quality of the optical components may be generally tested by measuring the absorption of DUV (or VUV for $F_2$ lasers) radiation that leads to hearing of the optical components and thermally induced distortions and defects, such as by measuring an intensity reduction by an incoming and outgoing beams through at material or optical component, or by measuring fluorescence emitted from materials being impinged upon by a DUV or VUV laser beam.

There are techniques for testing the quality of optical components of a line-narrowing module both individually and collectively prior to installation into a laser resonator (see U.S. patent application Ser. Nos. 09/454,803 and 60/178,804, which are assigned to the same assignee as the present application, and U.S. Pat. No. 5,894,392, each of which is hereby incorporated by reference). The '803 application discloses to test a line-narrowing module, or components thereof, by directing a beam of known wavelength through the test module or components and measuring parameters such as the spatial profile and bandwidth of the reflected beam. The '804 application discloses to test characteristics of optical materials such as absorption, such as by measuring fluorescence or intensity reduction of incident beams as they traverse the material, and homogeneity prior to forming optical components for use in line-narrowing applications. The '392 patent discloses to contact optical prisms with temperature sensors prior to assembling them into a line-narrowing module. By measuring the rate of temperature increase, the absorption of each prism and its quality is determined. It is desired to have a technique for quality monitoring or testing of optical components of a line-narrowing module on-line and moreover without installing intrusive thermal sensing devices into the laser resonator.

SUMMARY OF THE INVENTION

It is therefore an object of the invention to provide a technique for online monitoring or testing of the quality of optical components of a line-narrowing module of a laser system.

In accord with this object, a technique is provided wherein the output wavelength of a line-narrowed laser system drifts from a desired value as one or more optical components of the line-narrowing module is heated due to absorption of radiation of an operating laser system. The wavelength is tuned back to the desired wavelength using a feedback loop by rotating or otherwise adjusting one or more optical components of the line-narrowing module. The amount of rotation or adjustment of these optical components is monitored for indirectly measuring, and thereby testing, the absorption or quality of the optical components.

The grating, one or more prisms and/or one or more etalons may be rotated, or the pressure within an enclosure of one or more optics of the line-narrowing narrowing module may be adjusted, to adjust the wavelength back to the desired value. Preferably, both the grating and an etalon (when an etalon is used) are adjusted together to maximize the efficiency of the resonator. One or both of these adjustments may be monitored for quality testing. The testing is preferably performed when the laser is operating in cw mode, rather than burst mode.

BRIEF DESCRIPTION OF THE DRAWINGS

FIGS. 2b–2c illustrate how the gap spacing of an etalon changes as the etalon is heated due to absorption.

FIGS. 2d–2e illustrate how localized heating can distort the planarity of a prism surface.

INCORPORATION BY REFERENCE

What follows is a cite list of references each of which is, in addition to those references cited above and below herein, including that which is described as background, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

U.S. patent application Ser. Nos. 09/317,695, 09/317,527, 09/130,277, 09/244,554, 60/124,241, 60/140,532, 60/140, 531, 60/147,219, 09/073,070, 60/166,277, 60/166,967 and 60/167,835, each of which is assigned to the same assignee as the present application; and U.S. Pat. Nos. 5,761,236, 5,946,337, 5,095,492, 5,684, 822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536.

DETAILED DESCRIPTION OF THE PREFERRED EMBODIMENTS

Figure 1:
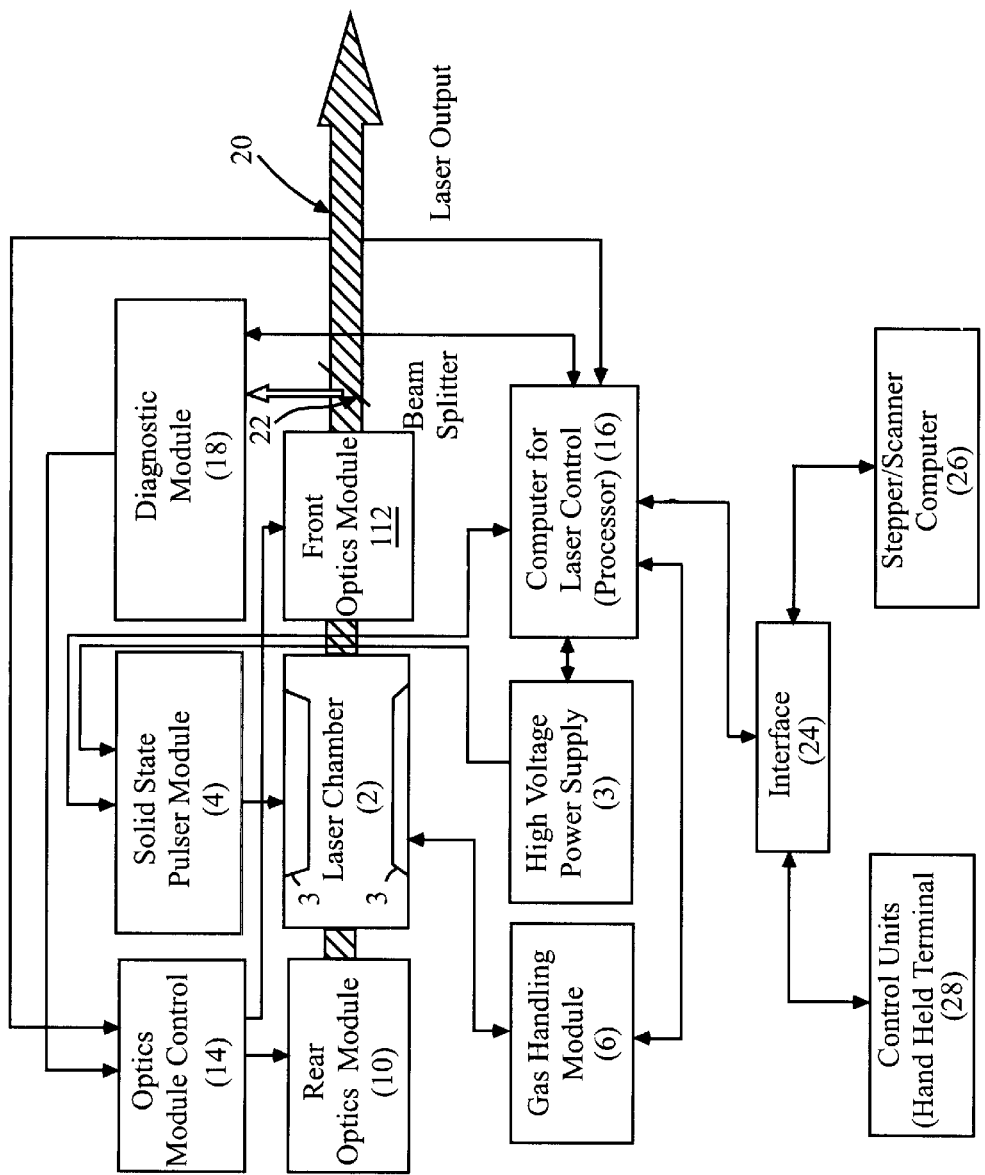
FIG. 1 schematically shows a laser system in accord with the present invention.

FIG. 1 schematically shows a laser system in accord with the present invention. The system includes a laser chamber 2 filled with a gas mixture and having a pair of main electrodes 3 and one or more preionization electrodes (not shown). The electrodes 3 are connected to a solid-state pulser module 4. A gas handling module 6 is connected to the laser chamber 2. A high voltage power supply 8 is connected to the pulser module 4. A laser resonator is shown surrounding the laser chamber and including a rear optics module 10 and a front optics module 12. One or both of the optics modules 10 and/or 12 includes a line-narrowing module in accord with the present invention, described in more detail below. An optics control module 14 communicates with the rear and front optics modules 10, 12, or alternatively, a processor 16 communicates directly with the optics modules 10 and 12. The computer or processor 16 controls various aspects of the laser system. A diagnostic module 18 receives a portion of the output beam 20 from a beam splitter 22.

The gas mixture in the laser chamber 2 typically includes about 0.1% $F_2$, 1.0% Kr and 98.9% Ne for a KrF-laser, 0.1% $F_2$, 1.0% Ar and 98.9% Ne and/or He for an ArF laser, and 0.1% $F_2$ and 99.9% Ne and/or He for a $F_2$ laser (for more derails on the preferred gas mixtures, see U.S. patent no. application Ser. Nos. 09/447,882, 09/418,052, 09/588,561, 09/416,344, 09/379,034, 09/484,818, 60/171,7717 and 09/513,025, and U.S. Pat. Nos. 4,393,505, 6,157,663 and 4,977,573, each of which is assigned to the same assignee as the present application, and is hereby incorporated by reference). The laser system may be another laser system including a line-narrowing module such as a dye laser. A trace amount of a gas additive such as xenon, argon or krypton may be included (see the '025 application, mentioned above).

The gas mixture is preferably monitored and controlled using an expert system (see the '034 application, mentioned above). One or more beam parameters indicative of the fluorine concentration in the gas mixture, which is subject to depletion, may be monitored, and the gas supply replenished accordingly (see the '882, '052, '717, '034, and '818 applications, mentioned above). The diagnostic module 18 may include the appropriate monitoring equipment or a detector may be positioned to receive a beam portion split off from within the laser resonator (see the '052 application).

The processor 16 preferably receives information from the diagnostic module 18 concerning the halogen concentration and initiates gas replenishment actions such as micro-halogen injections, mini and partial gas replacements, and pressure adjustments by communicating with the gas handling module 6.

Although not shown, the gas handling module 6 has a series of valves connected to gas containers external to the laser system. The gas handling module 6 may also include an internal gas supply such as a halogen and/or xenon supply or generator (see the '025 application). A gas compartment (not shown) may be included in the gas handling module 6 for precise control of the micro halogen injections (see the '882 and '717 applications, mentioned above, and U.S. Pat. No. 5,396,514, which is assigned to the same assignee as the present application and is hereby incorporated by reference).

Preferred main electrodes 3 are described at U.S. patent application Ser. Nos. 09/453,670 and 60/184,705, which is assigned to the same assignee as the present application and is hereby incorporated by reference. Other electrode configurations are set forth at U.S. Pat. Nos. 5,729,565 and 4,860,300, each of which is assigned to the same assignee and is hereby incorporated by reference. Preferred preionization units are set forth at U.S. patent application Ser. Nos. 09/692,265 and 09/247,887, each of which is assigned to the same assignee as the present application and is hereby incorporated by reference. The preferred solid state pulser module 4 and the high voltage power supply 8 are set forth at U.S. Pat. Nos. 6,020,723 and 6,005,880, and U.S. patent application Ser. Nos. 09/640,595, 60/204,095, 60/223,027 and 09/390,146, each of which is assigned to the same assignee as the present application and is hereby incorporated by reference into the present application.

The processor 16 is also shown connected to an interface 24. The interface 24 allows the processor 16 to communicate, e.g., with a stepper/scanner computer 26 associated with an imaging system for photolithography. The interface 24 also allows the processor 16 to communicate with control units 28 at a hand held terminal, also associated with the imaging system or otherwise at the fab.

As shown in FIG. 1, the processor 16 communicates with various modules of the laser system through various interfaces. In addition, some of the modules may communicate directly with each other, e.g., some of the modules may be configured with their own microprocessors. The processor 16 is communicating through the six interfaces shown for the purposes of illustration and may communicate through more or fewer interfaces and with a variety of other modules through the same or additional interfaces depending on the configurational specifications of the laser system.

The wavelength and bandwidth of the output beam 20 are also preferably monitored and controlled. Preferred wavelength calibration apparatuses and procedures are described at the '344 application, mentioned above, and U.S. patent application Ser. Nos. 09/271,020 and 60/198,058, and U.S. Pat. Nos. 4,905,243 and 6,160,832, each of which is assigned to the same assignee as the present application and is hereby incorporated by reference. The monitoring equipment may be included in the diagnostic module 18 or the system may be configured to outcouple a beam portion elsewhere such as from the rear optics module 10, since only a small intensity beam portion is typically used for wavelength calibration (see the '344 application).

In particular accord with the present invention, the processor 16 communicates with the optics control module 14 and the diagnostic module 18 for controlling the wavelength of the output beam 20. The processor 16 receives a signal from the diagnostic module 18 indicative of the wavelength of the output beam 20. The processor 16 compares the wavelength information received and compares it with programmed target wavelength information.

If it is determined by the processor 16 that the present wavelength is deviated from a target wavelength, then the processor 16 signals the optics control module 14 to initiate a wavelength adjustment procedure. It is understood that the system could be configured such that the processor 16 both initiates and controls the wavelength adjustment procedure. Preferably, though, the optics control module 14 communicates with one or more line narrowing optics alignment adjustment mechanisms to control the adjustment.

Although not shown, a laser beam path from the output coupler, e.g., at the front optics module 12, to an imaging system or application may be enclosed within an enclosure such as is described at U.S. patent application Ser. Nos. 09/343,333, 09/594,892 and 09/131,580, each of which is assigned to the same assignee and is hereby incorporated by reference. Similar enclosures may seal the path between the chamber and optics modules 10, 12 within the laser resonator, and between the beam splitter 22 and the diagnostic module or the diagnostic module 18, beam splitter 22 and/or front optics module 12 are contained in a same enclosure (see the 60/17,393 and 60/166,967 U.S. patent applications, which are assigned to the same assignee and are hereby incorporated by reference). Such enclosures are particularly preferred for the $F_2$ laser, and also for the ArF laser.

Figure 2A:
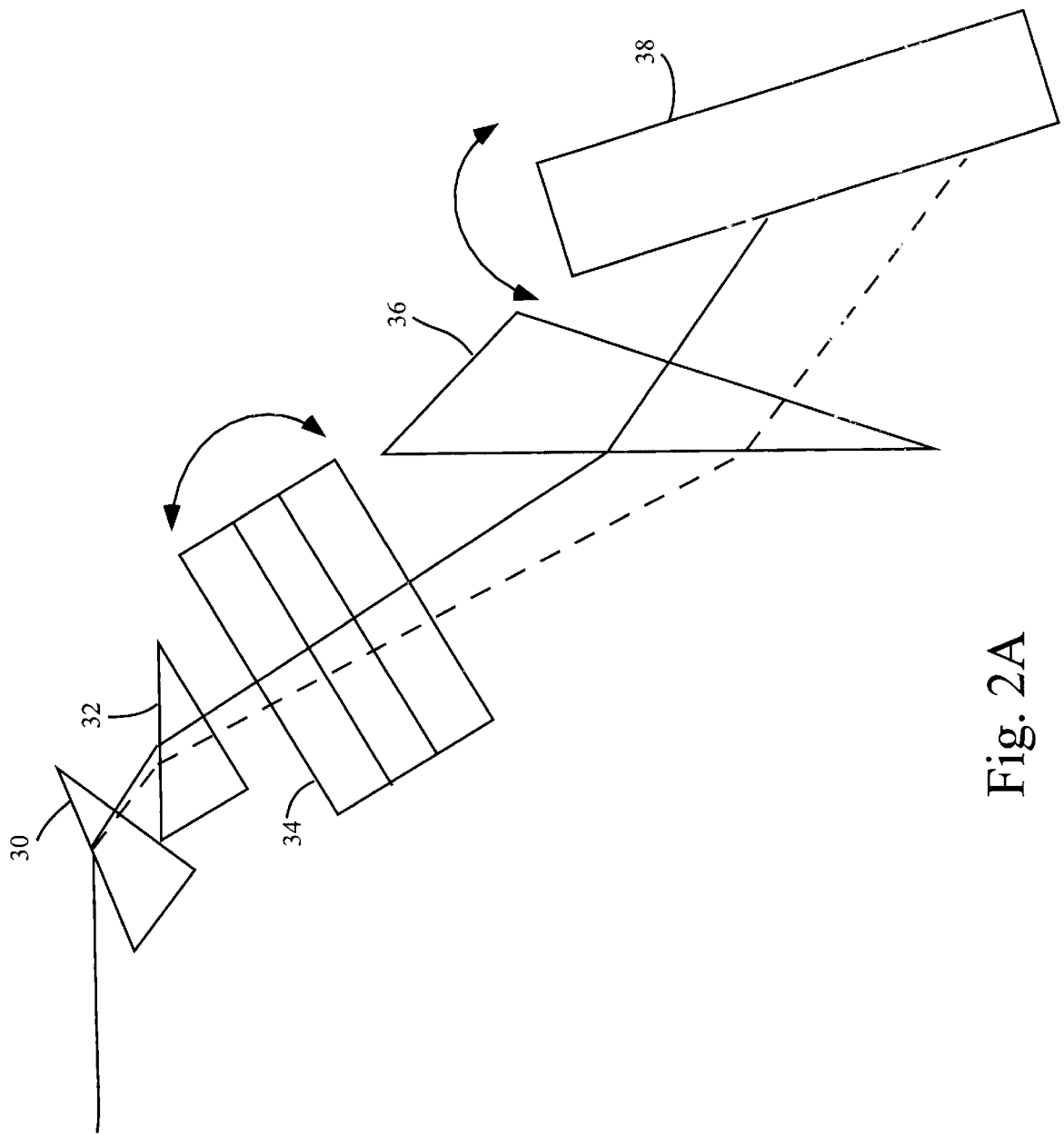
FIG. 2a schematically shows a line-narrowing module in accord with a first embodiment of the present invention.

FIG. 2a schematically shows a line-narrowing module in accord with a first embodiment of the present invention. The line-narrowing module shown in FIG. 2a is particularly configured for use with a KrF laser. A modification of the arrangement of FIG. 2a for the $F_2$ laser may be to replace the grating 38 with a highly reflective (HR) mirror and take out the prism 36, and/or to add an amplifier such as is described at U.S. patent application Ser. No. 09/599,130, which is assigned to the same assignee as the present application and is hereby incorporated by reference. The line narrowing module includes a first beam expanding prism 30 and a second beam expanding prism 32, an etalon 34, and a third beam expanding prism 36 before a grating 38. The grating 38 may be substituted by a highly reflective (HR) mirror in some applications, e.g., for a line-narrowing module for use with a semi-narrowband laser or as described above for the $F_2$ laser or with line-narrowing optics in the front optics module (see the '967 application). More or fewer than three prisms may be included, and two or more etalons or no etalon may be included. A dispersive prism, a transmissive or reflective grism, or a transmission grating may also be included (see the 09/602,184 application, incorporated by reference above).

Each of the prisms 30, 32 and 36 serves to expand the beam, such that by the time the beam reaches the grating 38, the beam is expanded to encompass a large portion of the grating 38, and beam divergence is also advantageously reduced. At high repetition rates, e.g., more than 1 kHz, the positions of the prism 36 and etalon 34 may be switched, particularly when the discharge width is reduced to achieve a greater clearing ratio. The prisms 30, 32 and 36 expand the beam owing to their refractive nature. The index of refraction of each prism 30, 32 and 36 is in turn dependent on the temperature of the prism, particularly at the area on the surface of each prism 30, 32 and 36 that is impinged upon by the beam.

At those areas of the surfaces, as well as the volumes, of the prisms 30, 32 and 36, absorption occurs. The energy of the absorbed portion of the beam is converted to heat, and the index of refraction changes as the prism temperatures rise. The refractive index changes result in changes in the refraction angles of the beam at those surfaces. The solid and dashed lines shown in FIG. 2a illustrate how a ray of a certain wavelength travels along two different paths for two different temperature states of the prisms 30, 32 and 36. Other effects such as bandwidth broadening due to distortions of the planarity of the surfaces of the prisms 30, 32 and 36 are also induced by the temperature change.

At least two significant effects on the wavelength that will be reflected back out of the line-narrowing module occur. First, the angle at which rays traverse the gap spacing of the etalon 34 is changed. This changes the spectral positions of interference maxima according to:

$$2n_{gap}d \cos \theta = m\lambda \qquad (1);$$

where d is the gap spacing, $n_{gap}$ is the temperature dependent index of refraction in the gap (not to be confused with $n_e(T)$ which is the index of refraction of the material of the etalon plates), and $\theta$ is the angle the ray makes with the planes of the etalon plates.

As is understood by those skilled in the arc, an etalon is a specific case of a more general class of interferometric devices, wherein an etalon has a pair of parallel plates. The etalon 34 shown in FIG. 2a is one that has a pair of flat plates, although an etalon may generally have curved plates or may have another geometry wherein a gap spacing between the plates is constant over the cross section of the etalon. Wherever an etalon is mentioned herein, an interferometric device may be substituted and used within the scope of this description of the preferred embodiments.

Figure 3:
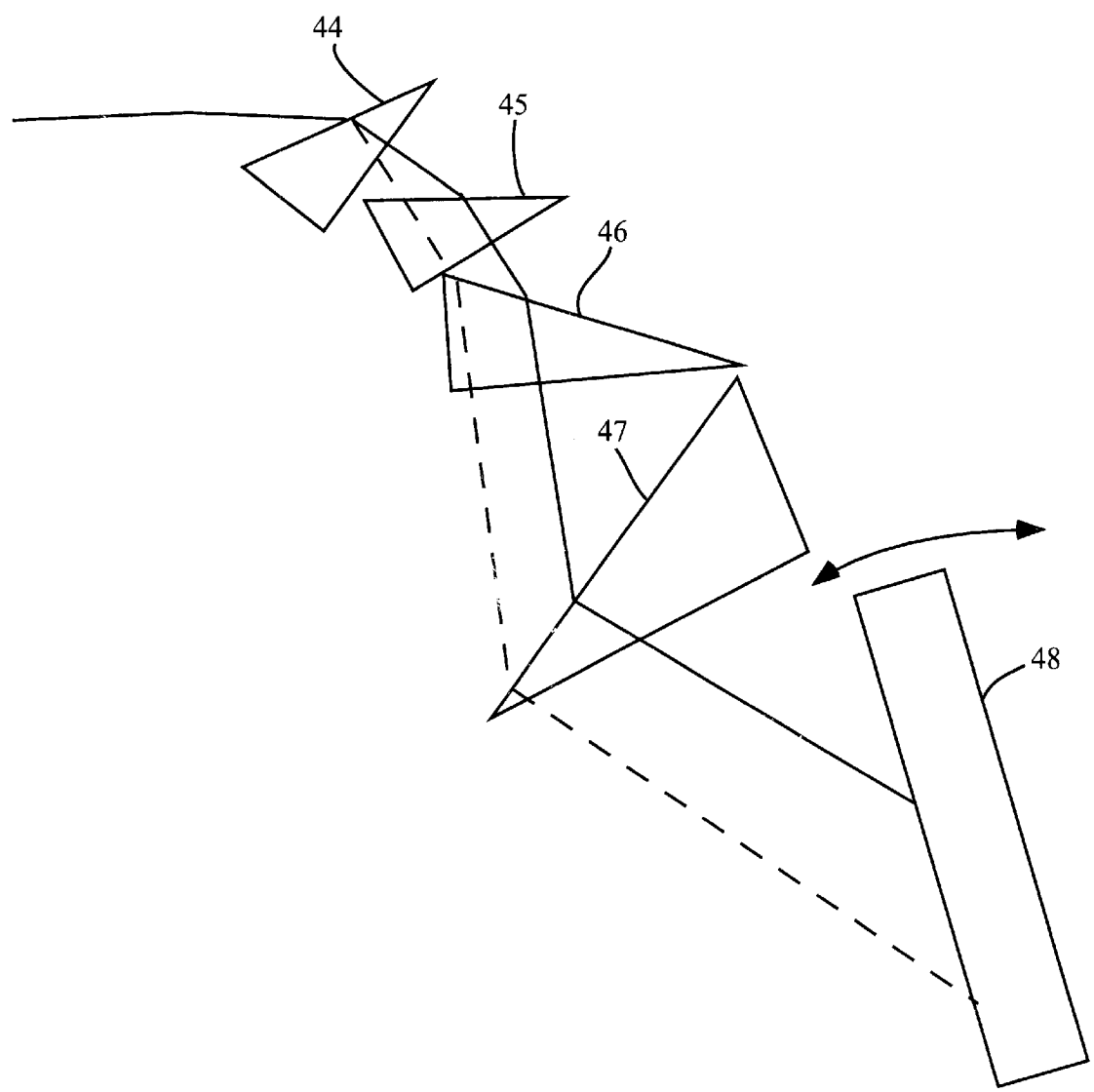
FIG. 3 schematically shows a line-narrowing module in accord with a second embodiment of the present invention.

In addition, although the preferred embodiments describe line-narrowing modules, e.g., at FIGS. 2a and 3, preferably included in the rear optics module 10 of FIG. 1, an output coupling interferometer may be included at the front optics module 12. The interferometer used as an outcoupler would be preferably a device having at least one curved inner surface and one flat inner surface, or two curved inner surfaces having opposing curvatures, such as are described at U.S. patent application Ser. No. 09/715,803, which is assigned to the same assignee and is hereby incorporated by reference. The inner surfaces of the interferometer are non-parallel which serves to improve spectral purity by cutting out spectral sidebands. The interferometer may alternatively be an etalon or quasi-etalon. Such an output coupling interferometer may be included in a laser resonator including any of the line-narrowing modules set forth in this description of the preferred embodiments, and may be used in an optics monitoring method according to these preferred embodiments, although rotation of the output coupling interferometer would be restricted owing to its function of reflecting the beam back through the laser resonator rather than being transmissive like the etalon shown in FIG. 2a.

A second temperature induced effect on the optics is that the angle at which rays strike the grating 38 is changed. This changes the central wavelength reflected from the grating 38 back into the acceptance angle of the resonator according to:

$$2d \sin \alpha = p\lambda \qquad (2);$$

where d is the groove spacing and $\alpha$ is the blaze angle for a blazed echelle grating.

As shown in FIG. 2a by the arrows near the etalon 34 and grating 38, each of the etalon 34 and the grating 38 may be rotated to compensate the wavelength changes just described. One or more of the prisms may also be rotated, and when prism rotation is used, preferably two prisms are rotated synchronously to compensate deviations of the directions of rays refracted by each prism (see the '554 application, mentioned above).

FIGS. 2b–2g illustrate further changes that may be induced by the absorption of the beam by the etalon 34 and prisms 30, 32 and 36. FIG. 2b shows an etalon before any thermally induced changes are incurred, such as prior to operation or after a long pause in laser operation. The etalon 34 comprises two plates 40 separated by a gap d. The etalon 34 has two spacers 42 typically comprising zerodur™, which is a glass ceramic material sold by Schott Glass Technologies, Inc.

FIG. 2c illustrates what occurs when absorption occurs when a beam is passing through the etalon 34. The plates "breath" due to thermal expansion based on the temperature dependent index of refraction $n_e(T)$ of the plates 40 changing the gap spacing to d'. The breathing is most pronounced where the absorption occurs. This breathing not only broadens the beam because the plates are less planar than those shown in FIG. 2b, but it also changes the interference spectrum as understood from equation (1). The etalon plates 40 preferably comprise calcium fluoride to minimize this effect (see U.S. patent application Ser. No. 60/162,735, which is assigned to the same assignee and is hereby incorporated by reference).

FIG. 2d shows a beam expanding prism such as the prisms 30, 32 and 36 of FIG. 2a. The prism has an apex angle y and smooth surfaces. FIG. 2e shows how absorption of the beam causes the planarity of the surface to distort. The distortion of the surface causes an undesirable broadening of the beam in addition to the refractive angle changes described above based on the temperature dependent index of refraction $n_p(T)$. The prisms 30, 32 and 36 preferably comprise calcium fluoride, particularly for $F_2$ and ArF laser applications, and/or fused silica, e.g., for KrF laser applications, to minimize this effect (see the '236 patent, mentioned above, and U.S. patent application Ser. No. 09/584,420, which is assigned to the same assignee and is hereby incorporated by reference).

Figure 2F:
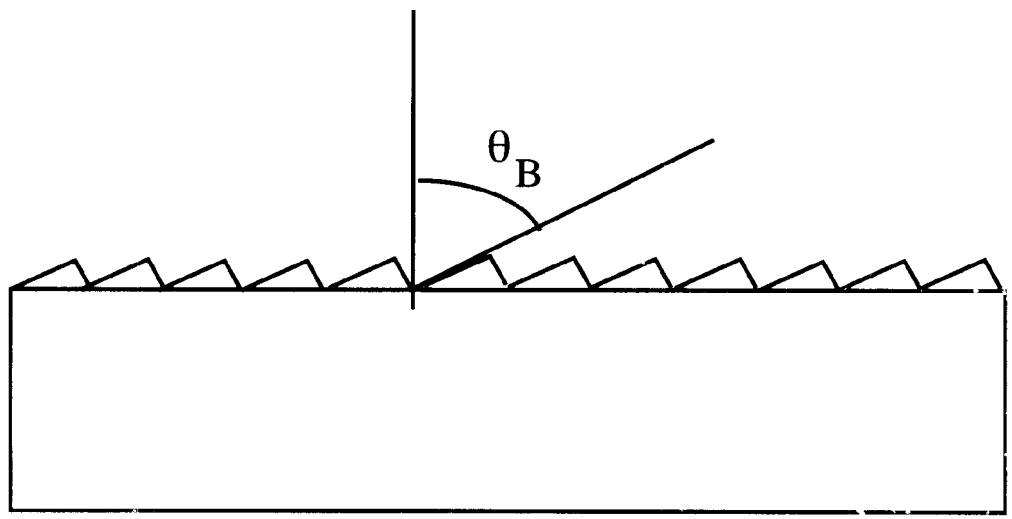
FIGS. 2f–2g illustrate how localized heating of a grating can distort the planarity of the grating surface.
Figure 2G:
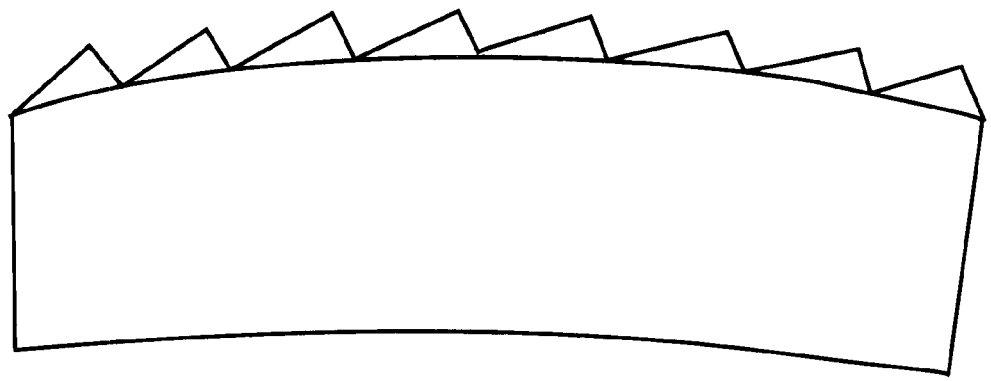

FIGS. 2f and 2g illustrate how a thermally induced curvature of the grating may also be effected. FIG. 2f illustrates a grating prior to any thermally induced distortions, and FIG. 2g illustrates a changing of the curvature of the grating surface (exaggerated for illustration) due to thermal effects. Undesirable effects on the selected wavelength of the line-narrowing module of the laser, see above discussion, also result from the distortion of the grating surface shown at FIG. 2g.

FIG. 3 schematically shows a line-narrowing module in accord with a second embodiment of the present invention. The line-narrowing module of FIG. 3 is particularly configured for use with a ArF laser. The line-narrowing module includes four beam expanding prisms 44–47 and a grating 48. The prisms 44–47 and grating 48 undergo the same effects described above and that entire discussion is incorporated herein. It is noted here that a mirror may be disposed before or after the grating 48 (or 38 of FIG. 2a), such as in Littman configuration, for rotation to tune the wavelength, rather than the grating 48 (or 38) (see U.S. Pat. No. 6,028,879, hereby incorporated by reference).

The difference between the optical paths taken by a ray of a certain wavelength are again illustrated by the solid and dashed lines causing the incidence angle at the grating 48 to change and the central wavelength reflected back into the acceptance angle of the resonator. The grating 48 is again rotatable to counteract these absorption induced wavelength changes, and one or more, and preferably two, see above, of the prisms 44–47 may also be rotatable. More or fewer than four prisms may be included, one or more etalons may be included, and a HR mirror or grism may substitute for the grating 48. Also, an output coupling interferometer (see the '803 application, mentioned above, may be included in the resonator to participate in line-narrowing of the laser beam 20 of FIG. 1.

Although a preferred line-narrowing module for the $F_2$ laser is not shown here, such are described in the '695, '130, '967, '993 and '527 applications, as well as U.S. patent application Ser. No. 60/212,183, which is assigned to the same assignee and is hereby incorporated by reference, and elsewhere in the above references. In addition, a transmission grating, transmission grism or reflection grism may be included. As with any laser according to the preferred embodiments, line-narrowing may be performed at either or both ends of the laser tube, i.e., at the front and/or rear optics modules 10 and 12. In addition, an etalon, transmission grating or transmission grism output coupler may be used, or polarization outcoupling may be used.

Figure 4A:
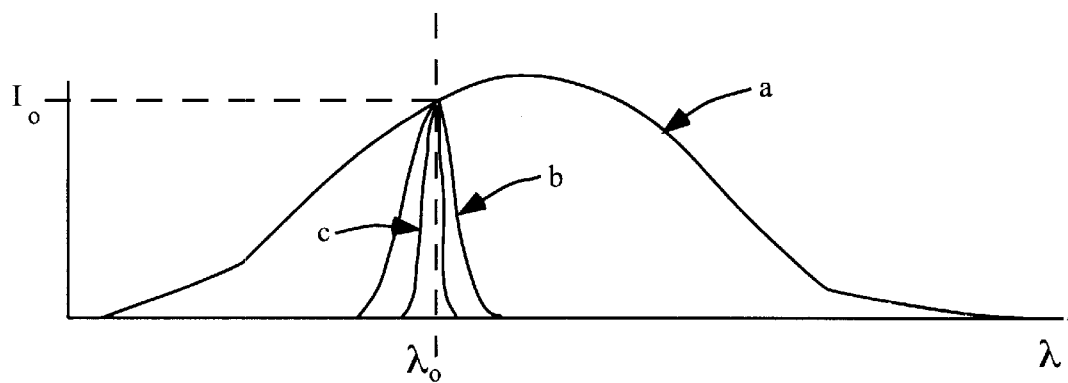
FIG. 4a illustrates how the bandwidth and wavelength of a broadband laser emission are narrowed and tuned using a dispersive element and an etalon.

FIG. 4a illustrates how the bandwidth and wavelength of a broadband laser emission are narrowed and tuned using a dispersive element and an etalon, such as the grating 38 and etalon 34 of FIG. 2a. The spectral intensity distribution (labeled "a") of a broadband ArF or KrF laser is shown (and the distribution "a" may be an exaggerated $F_2$ laser line). The grating 38 (again, or other dispersive element) of FIG. 2a in combination with the magnification produced by the beam expanding prisms, e.g., 30, 32 and 36 of FIG. 2a, narrows the bandwidth as depicted by the gaussian feature labeled "b". The etalon of FIG. 2a or output coupling interferometer of the '803 application, see above, may further narrow the spectrum until the output lineshape of laser is as shown in the feature labeled "c". The peaks of the grating spectrum b and the etalon spectrum c are shown as matched up at $\lambda_0$. For the ArF and KrF lasers, of course, the etalon alone would not be sufficient since the interference spectrum of the etalon is periodic in $\lambda$, and would repeat several times in the broadband spectrum a, although an etalon may be sufficient without a grating for the $F_2$ laser (see the '527 and '183 applications, mentioned above). Two or more etalons could substitute for using the dispersive element, wherein careful and complicated alignment procedures are performed (see U.S. Pat. No. 5,081,635, hereby incorporated by reference).

Figure 4B:
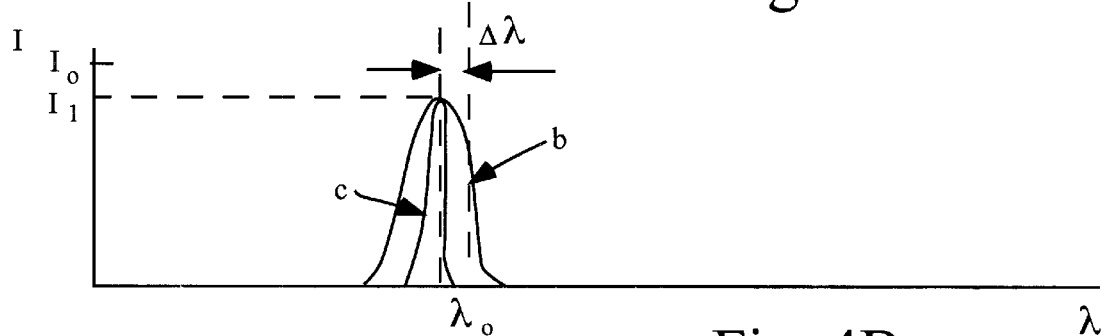
FIG. 4b illustrates how the wavelength is shifted due to thermal heating of one or more optical components of the line-narrowing module.

FIG. 4b illustrates how a wavelength shift of $\Delta\lambda$ due to thermal heating of one or more optical components of the line-narrowing module. Thus, the wavelength shown has shifted to $\lambda_0 - \Delta\lambda$. It is important to maintain the desired wavelength, so the optical etalon is rotated (or the pressure in the gap or enclosure changed, see the '527 and '445 applications, mentioned above) to compensate the heating effects, and return the etalon spectrum c back to center on $\lambda_0$.

Figure 4C:
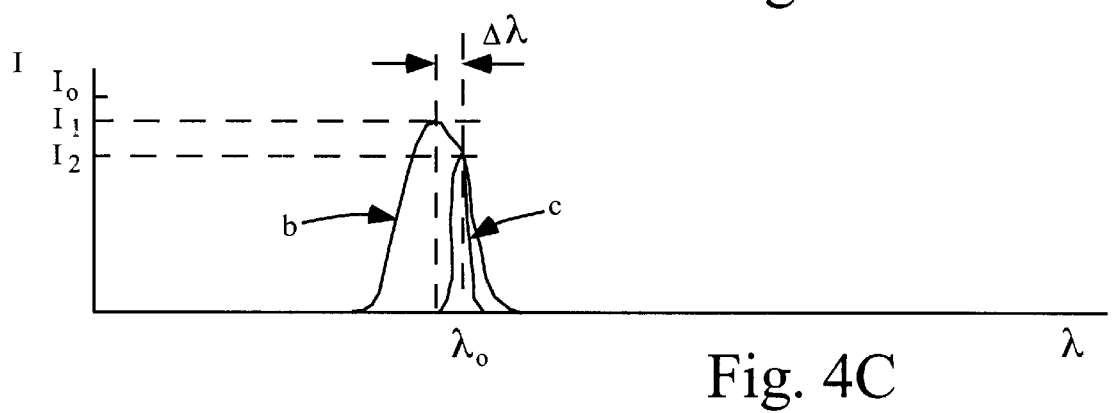
FIG. 4c illustrates how only adjusting the etalon can result in reduced laser efficiency and/or inaccurate monitoring information.

FIG. 4c illustrates how only adjusting the etalon can result in reduced laser efficiency. As seen in FIG. 4c, the grating spectum b is not aligned with the etalon spectrum c after only the etalon is rotated. Thus, the intensity is $I_2$, which is below the intensity $I_0$ for the aligned spectra b and c shown in FIG. 4a. The wavelength has been returned to $\lambda_0$ from $\lambda_0 - \Delta\lambda$, though. Thus, the grating is now rotated to return the peak of the grating spectrum b back to $\lambda_0$ from $\lambda_0 - \Delta\lambda$, as well.

Figure 4D:
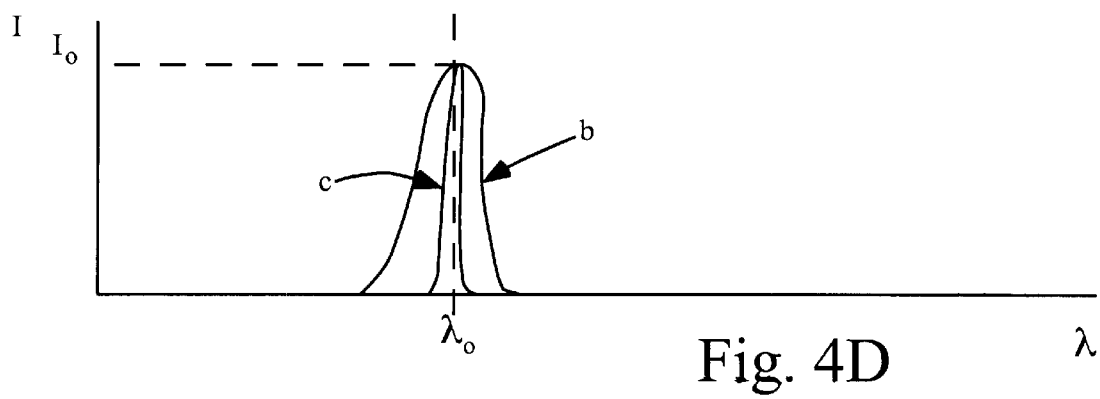
FIG. 4d illustrates how adjusting the grating as well as the etalon serves to maximize the laser efficiency.

FIG. 4d illustrates how adjusting the grating as well as the etalon serves to maximize the laser efficiency. The grating spectrum b and the etalon spectrum c are now each centered at the target wavelength $\lambda_0$. The two rotations, i.e., of the etalon 34 and of the grating 38, returned the output beam to the target wavelength $\lambda_0$, and target intensity $I_0$. In reality, the broadening due to effects shown, e.g., at FIGS. 2c and 2e would result in the peak intensity being somewhat less than $I_0$.

In the preferred embodiments and typically during operation of a laser system, the grating and the etalon are stepped along every few seconds or as the temperature induced effects on the wavelength evolve. It is recognized herein that the amount of rotation of these elements is related to the absorption of the optics of the line-narrowing module. That is, the greater the absorption, the more rotation is performed to compensate the effects of the absorption. Thus, based on the amount of rotation of the optics that are rotated, be they the grating, one or more interferometric devices such as etalons, one or more prisms, or grism(s), or a combination thereof, the quality of the optics and the line-narrowing module itself are determined. When the amount of rotation exceeds a threshold amount, it is determined that the quality of the optics is below a quality threshold and the line-narrowing module is preferably replaced, or alternatively, one or more line-narrowing optics are replaced.

It is also recognized that the wavelength itself may be monitored in accord with a preferred embodiment in an open feedback loop. That is, only one component such as the etalon or grating may be rotated for wavelength adjustment, and the wavelength versus time would reveal the quality of the optics rather than the motor positions driven in accord with the plots shown in FIG. 5 below. In addition, it is recognized that monitoring parameters other than the wavelength in this way can reveal the optics quality as well. Such other parameters may include far field beam direction, far or near field symmetry, or another quantity derived from any of these parameters.

Figure 5:
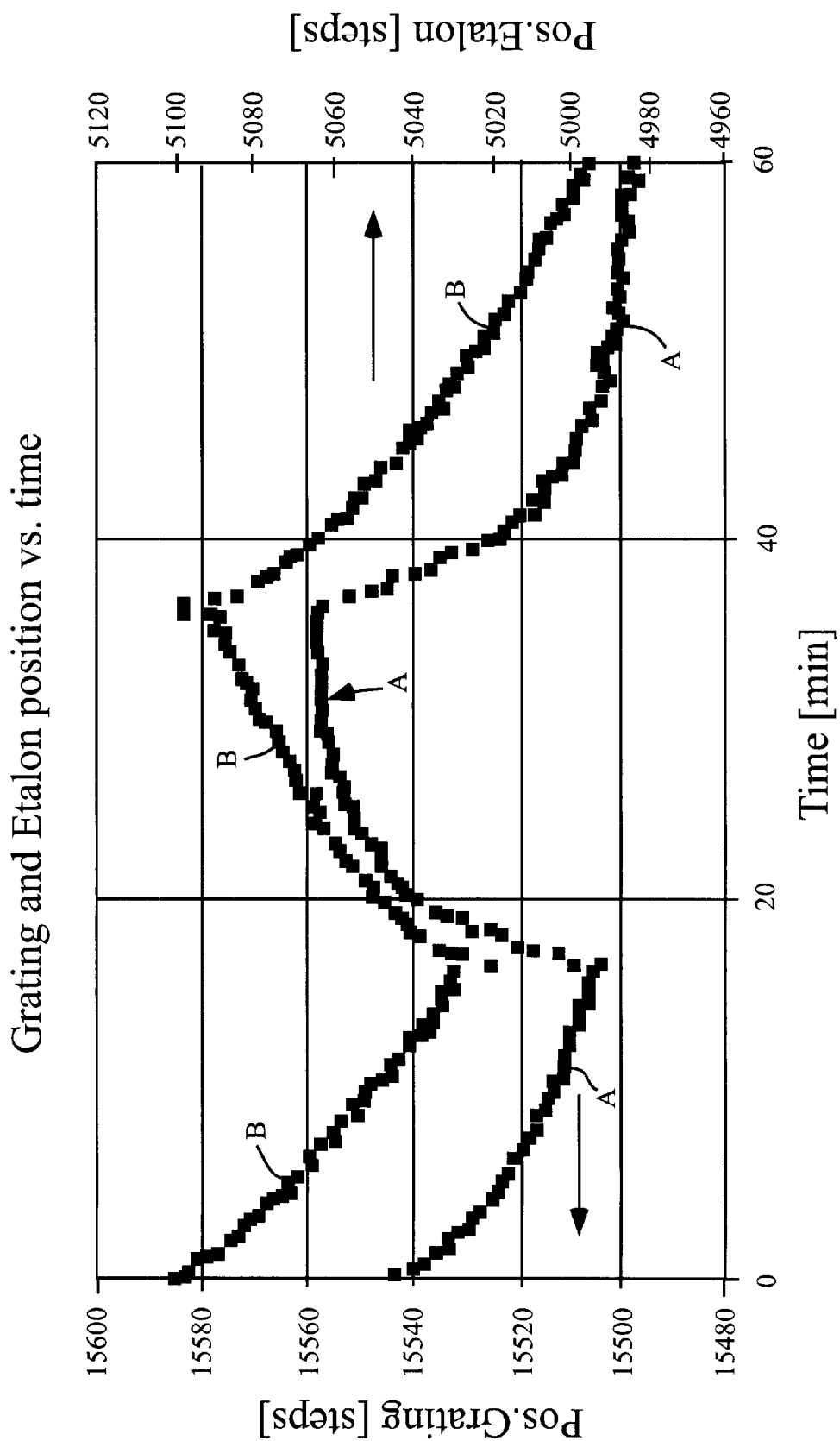
FIG. 5 is a graph including two plots, one of grating position versus time and the other of etalon position versus time as each component is adjusted during a 60 minute laser operation test run, with the laser operating at 1 kHz from around 0–17 and 37–60 minutes and at 5 Hz from around 17–37 minutes.

FIG. 5 is a graph including two plots. The first plot A is the grating rotation position versus time over a period of 60 minutes during a test in accord with a preferred embodiment. The second plot B is the etalon rotation position versus time over the same period, also in accord with the preferred embodiment. Each component was adjusted during the 60 minute laser operation test run in steps of several seconds. That is, every several seconds, the processor received wavelength information, determined whether a rotation was called for, and initiated any rotation by signalling the optics control module, as discussed above with respect to FIG. 1. The laser was operated at 1 kHz for about the first 17 minutes, at 5 Hz for the next 20 minutes, and again at 1 kHz for about the final 23 minutes, which accounts for changes in rotation direction shown in the plots of FIG. 5.

FIG. 5 illustrates an advantageous feature that the rotation positions of each of the grating and the etalon clearly correspond to the absorption by the optics of the line-narrowing module. As the optics heated up when the laser was operated at 1 kHz, the grating and etalon were stepped away from their initial positions. The step number being shown to decrease somewhat linearly over the first 20 minutes. The grating position appeared to be reaching a saturation, while the etalon did not.

This effect is due to the special embodiment being used. Prisms 30 and 32 act in the same direction when heated by the laser beam, whereas prism 34 compensates the effect of the first two prisms (see U.S. Pat. No. 5,761,236, assigned to the same assignee and hereby incorporated by reference). The etalon has to compensate for the effect of the prisms 30 and 32, and the grating for the effect of all three prisms 30, 32 and 34.

As the optics were cooling in the middle 20 minutes (approximately), the grating and etalon gradually returned to their initial positions, as shown by the step number increasing. Again, the grating position appeared to saturate, while the etalon position did not. As the optics were again heating up in the final 20 minutes when the laser was operating at 1 kHz, the grating and etalon moved away from the initial positions again as in the first approximately 20 minutes. It is noted that at higher repetition rates, the effects of heating are increased, and so the method of these preferred embodiments is particularly preferred when the laser is operation at, e.g., 2 kHz or more.

A quantitative association can be made between the quality of the optics and the data measured of the grating and/or etalon positions, and a determination made as to whether the optics are "good" (continue use) or "bad" (replace). An expert system stored in a memory accessible by the processor could be used to automatically make this determination. The expert system would include information relating to various optics of various line-narrowing modules for various tests including varying repetition rates and durations. The tests are preferably performed using cw mode or continuous output, but burst mode tests could also be performed. In addition, the tests could be performed while the laser is being used to process a workpiece.

Figure 6:
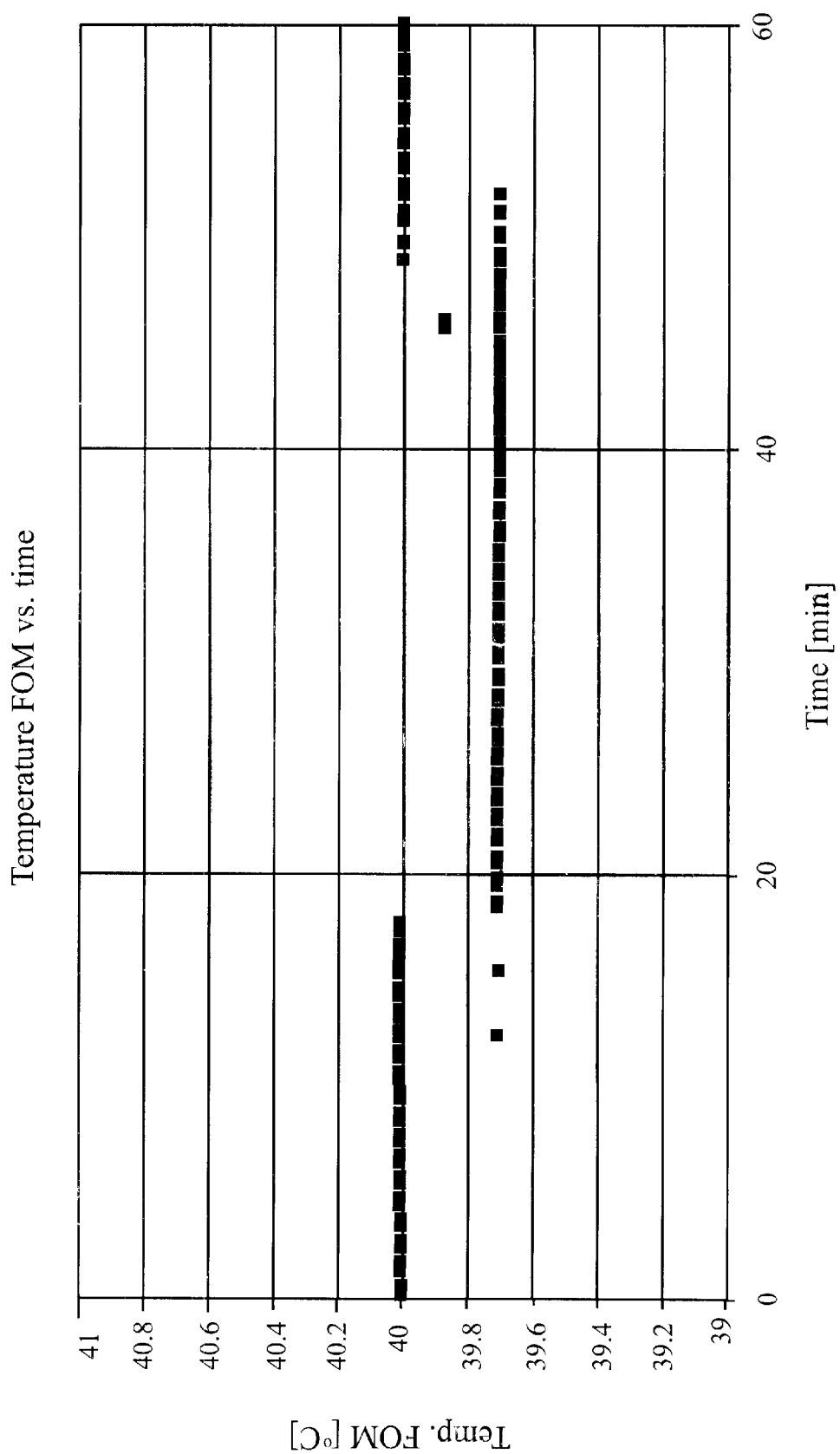
FIG. 6 is a graph of the temperature within the optics module containing the line-narrowing module versus time showing that the ambient temperature in the module was kept relatively constant during the 60 minute run of FIG. 5.

FIG. 6 is a graph of the temperature within the optics module containing the line-narrowing module versus time showing that the ambient temperature in the module was kept relatively constant during the 60 minute run of FIG. 5. By keeping the temperature relatively constant over the 60 minute duration of the run, it is possible to determine that localized heating effects were responsible for wavelength changes resulting in rotations of the optics.

Advantageously, the above described method may be used to quantify the absorption of optical components within the laser resonator, particularly the line-narrowing module. Those components of poor quality may be quantified and a decision made whether to replace the optics module based on the quality determination and quantification. Wavelength stability may be greatly improved in accord with the preferred embodiments even after a long break in the operation of the laser.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

What is claimed is:

1. A method for testing quality of optics of a line-narrowing module installed within a resonator of a laser emitting a line-narrowed output beam, comprising the steps of:

operating said laser to generate the line-narrowed output beam;

adjusting one or more optical components of the line-narrowing module to compensate absorption-induced wavelength changes of the line-narrowed output beam;

monitoring an amount of the adjusting of said one or more optical components; and determining the quality of the optics of the line-narrowing module based on the amount of adjusting performed to compensate the absorption-induced wavelength changes of the line-narrowed output beam.

2. The method of claim 1, wherein the monitored amount of adjusting includes an amount of rotation of a grating.

3. The method of claim 2, wherein the monitored amount of adjusting includes an amount of rotation of an interferometric device of the line-narrowing module.

4. The method of claim 1, wherein the monitored amount of adjusting includes an amount of rotation of an interferometric device of the line-narrowing module.

5. The method of claim 4, wherein the monitored amount of adjusting further includes an amount of rotation of a highly reflective mirror.

6. The method of claim 1, wherein the monitored amount of adjusting includes an amount of rotation of one or more prisms.

7. The method of claim 1, wherein the monitored amount of adjusting includes an amount of rotation of a highly reflective mirror.

8. The method of claim 1, wherein the monitored amount of adjusting includes an amount of pressure change in an enclosure of one or more optical elements of the line-narrowing module, wherein said pressure in said enclosure determines the wavelength of the output beam.

9. The method of claim 1, wherein the laser is operated in cw mode during the testing.

10. The method of claim 1, wherein the laser is operating in burst mode during the testing.

11. The method of claim 10, wherein the laser is processing a workpiece during the testing.

12. A method for testing a quality of optics of a line-narrowing module of a laser emitting an output beam, comprising the steps of:

operating said laser to generate the output beam;

monitoring a parameter of the output beam which varies based on the quality of the optics of the line-narrowing module, said monitoring being performed while adjustments are not being performed to compensate changes in the value of the parameter; and determining the quality of the optics of the line-narrowing module based on variations in said parameter.

13. The method of claim 12, wherein the parameter is selected from the group of parameters consisting of rate of change of wavelength, bandwidth, far-field beam direction, far field beam profile symmetry, near field beam profile symmetry and a quantity derived from one or more of these parameters.

14. The method of claim 12, further comprising the step of replacing the line-narrowing module when the quality of the optics is determined to be below a quality threshold.

15. The method of claim 12, further comprising the step of:

determining whether a variation of said parameter exceeds a threshold amount.

16. The method of claim 15, further comprising the step of replacing at least one of said line-narrowing optics when said amount of variation of said parameter is determined to exceed said threshold amount.

17. The method of claim 15, further comprising the step of replacing said line-narrowing module when said amount of variation of said parameter is determined to exceed said threshold amount.

18. The method of claim 12, further comprising the step of adjusting one or more components of the line-narrowing module to compensate wavelength changes to the output beam while said laser is operating.

19. The method of claim 18, said components comprising optical components, said adjusting including adjusting an orientation of said one or more optical components to compensate said wavelength changes to the output beam.

20. The method of claim 12, wherein the monitoring is performed during an initialization of said laser.

* * * * *